United States Patent
Cain, III et al.

(10) Patent No.: US 9,304,863 B2
(45) Date of Patent: Apr. 5, 2016

(54) TRANSACTIONS FOR CHECKPOINTING AND REVERSE EXECUTION

(71) Applicant: International Business Machines Corporation, Armonk, NY (US)

(72) Inventors: Harold W. Cain, III, Katonah, NY (US); David M. Daly, Croton-on-Hudson, NY (US); Kattamuri Ekanadham, Mohegan Lake, NY (US); Jose E. Moreira, Irvington, NY (US); Mauricio J. Serrano, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 336 days.

(21) Appl. No.: 13/929,107

(22) Filed: Jun. 27, 2013

(65) Prior Publication Data

US 2014/0281710 A1  Sep. 18, 2014

Related U.S. Application Data (60) Provisional application No. 61/790,096, filed on Mar. 15, 2013.

(51) Int. Cl.
*G06F 11/00* (2006.01)
*G06F 11/14* (2006.01)

(52) U.S. Cl.
CPC ........ *G06F 11/1438* (2013.01); *G06F 11/1407* (2013.01); *G06F 2201/81* (2013.01)

(58) Field of Classification Search
CPC . G06F 9/3842; G06F 11/141; G06F 11/1407; G06F 11/1446; G06F 11/1471; G06F 11/1474
See application file for complete search history.

(56) References Cited

U.S. PATENT DOCUMENTS

| | | | | |
|---|---|---|---|---|
| 7,376,798 | B1* | 5/2008 | Rozas | 711/144 |
| 7,849,450 | B1* | 12/2010 | Rydh et al. | 717/131 |
| 8,276,127 | B2 | 9/2012 | Rydh et al. | |
| 8,812,907 | B1* | 8/2014 | Bissett et al. | 714/20 |
| 8,880,480 | B2* | 11/2014 | Kundu et al. | 707/682 |
| 9,047,169 | B1* | 6/2015 | Haase et al. | |
| 2006/0150010 | A1* | 7/2006 | Stiffler et al. | 714/13 |
| 2007/0220356 | A1* | 9/2007 | Ruscio et al. | 714/42 |
| 2008/0066055 | A1* | 3/2008 | Shebs | 717/124 |

(Continued)

OTHER PUBLICATIONS

Robert Rönngren "Adaptive checkpointing in Time Warp", 1994, ACM, vol. 24 Issue 1, Jul. 1994, pp. 110-117.*

(Continued)

*Primary Examiner* — Bryce Bonzo
*Assistant Examiner* — Jeison C Arcos
(74) *Attorney, Agent, or Firm* — Daniel P. Morris, Esq.; Otterstedt, Ellenbogen & Kammer, LLP

(57) ABSTRACT

A method of backstepping through a program execution includes dividing the program execution into a plurality of epochs, wherein the program execution is performed by an active core, determining, during a subsequent epoch of the plurality of epochs, that a rollback is to be performed, performing the rollback including re-executing a previous epoch of the plurality of epochs, wherein the previous epoch includes one or more instructions of the program execution stored by a checkpointing core, and adjusting a granularity of the plurality of epochs according to a frequency of the rollback.

19 Claims, 6 Drawing Sheets

(56) References Cited

U.S. PATENT DOCUMENTS

| | | | |
|---|---|---|---|
| 2010/0269102 A1* | 10/2010 | Latorre et al. | 717/130 |
| 2011/0029490 A1* | 2/2011 | Agarwal et al. | 707/684 |
| 2011/0061043 A1* | 3/2011 | Rydh et al. | 717/131 |
| 2011/0264898 A1* | 10/2011 | Chaudhry et al. | 712/228 |
| 2012/0079245 A1 | 3/2012 | Wang | |
| 2012/0079246 A1* | 3/2012 | Breternitz et al. | 712/208 |
| 2012/0096441 A1* | 4/2012 | Law et al. | 717/127 |
| 2013/0124828 A1* | 5/2013 | Chou et al. | 712/207 |
| 2013/0166523 A1* | 6/2013 | Pathak et al. | 707/703 |
| 2014/0033181 A1* | 1/2014 | Wang et al. | 717/129 |
| 2014/0351495 A1* | 11/2014 | Yoon et al. | 711/103 |

OTHER PUBLICATIONS

Liming Wang et al., An Effective Reversible Debugger of Cross Platform Based on Virtualization, 2009 International Conference on Embedded Software and Systems, pp. 448-453, IEEE, May 2009, Hangzhou, Zhejiang, P. R. China.

* cited by examiner

TRANSACTIONS FOR CHECKPOINTING AND REVERSE EXECUTION

CROSS-REFERENCE TO RELATED APPLICATIONS

This application claims the benefit of U.S. Provisional Patent Application No. 61/790,096 filed on Mar. 15, 2013, the complete disclosure of which is expressly incorporated herein by reference in its entirety for all purposes.

BACKGROUND

The present disclosure relates generally to the software arts, and more particularly, to methods for backstepping through a program execution.

In the field of software development, parallel programming is an approach to divide a problem into multiple parts, which can be processed simultaneously. More particularly, in parallel programming a task can be broken up into a plurality of independent threads (e.g., the threads do not share data). Each thread can run on a processor core, and no coordination between cores is needed.

Parallel programming can become more complex in the case of shared data. One existing method of performing a multi-threaded program with shared data is to use locks. Locks can be difficult to implement and can create the potential for deadlocks in programs where two threads are in a locked state waiting for the other thread to complete.

Transactional memory has been proposed to solve this kind of problem. With transactional memory, developers can mark the portions of programs that modify the shared data as being "atomic." Each atomic block or operation is executed within a transaction: either the whole operation executes, or none of it does. Within the operation, the program can read a shared value without locking it, and perform all the computations it needs to perform. At an end of the operation, the transaction can be committed to memory (i.e., a "commit" operation).

During the commit operation, the transactional memory system can determine if the shared data has been modified since the operation was started. If the shared data hasn't been modified, the commit operation can make an update to the shared value and the thread can carry on with its work. If the shared value has changed since the block was started, the transaction is aborted, and the work the thread did can be rolled back. In the case of rollback, the program can retry the operation.

Backstepping is a method for performing a rollback, which re-executes a previously executed operation. This can be useful in the field of debugging, for example, to determine where the behavior of a program differs from expectations.

The GNU DeBugger (GDB) is the GNU ("GNU's Not Unix!") Project debugger. GDB is popular tool for debugging software. GDB allows a user to observe each step of an executing program. GDB records a record for each instruction, enabling the user to debug backwards one instruction at a time. This type of debugging generates a large amount of data, such that the execution time becomes infeasible for large programs.

BRIEF SUMMARY

According to an embodiment of the present disclosure, a method of backstepping through a program execution includes dividing the program execution into a plurality of epochs, wherein the program execution is performed by an active core, determining, during a subsequent epoch of the plurality of epochs, that a rollback is to be performed, performing the rollback including re-executing a previous epoch of the plurality of epochs, wherein the previous epoch includes one or more instructions of the program execution stored by a checkpointing core, and adjusting a granularity of the plurality of epochs according to a frequency of the rollback.

According to an embodiment of the present disclosure, a method of checkpoint a program execution includes executing, speculatively, an epoch including at least one instruction, executing a store operation for a cache line address and an associated value corresponding to the at least one instruction, installing the cache line address and the associated value corresponding to the at least one instruction in a speculative store, writing the cache line address and the associated value installed in the speculative store to a checkpoint region to create a checkpoint, and writing a register state of a processor executing the epoch to the checkpoint region to create a checkpointed epoch.

According to an embodiment of the present disclosure, a method of concurrent checkpointing in a multi-core system includes signaling, by an active core, an end of a transaction to a checkpoint core, checking, by the checkpoint core, that all lines updated by the active core during the transaction have been fetched and saved to a checkpoint memory region, signaling, by the checkpoint core, to the active core that the active core can commit the transaction, and committing, by the active core, the transaction, wherein the active core forwards register data to the checkpoint core.

According to an embodiment of the present disclosure, a method for checkpointing a program execution can be performed by a computer program product, including a computer usable medium having a computer readable program code embodied therein, wherein the computer readable program code is configured to be executed by a processor.

BRIEF DESCRIPTION OF THE SEVERAL VIEWS OF THE DRAWINGS

Preferred embodiments of the present disclosure will be described below in more detail, with reference to the accompanying drawings.

DETAILED DESCRIPTION

Embodiments of the present disclosure relate to a method for backstepping through a program execution on demand.

Exemplary embodiments are described in the context of hardware implementing transactional memory in connection with speculative execution of a program of instructions.

Transactional memory groups or links a sequence of instructions including load and store instructions to execute in an atomic way; that is, as in an all-or-nothing fashion. Speculative execution refers to the execution of a thread given available data, whether or not that data is known to be up-to-date. In the case where the data is later determined to be up-to-date, a processor can commit that work or transaction, increasing the performance of a system. In the case where the data is determined to be stale, the speculative work can be abandoned and re-executed with a correct value.

Figure 1:
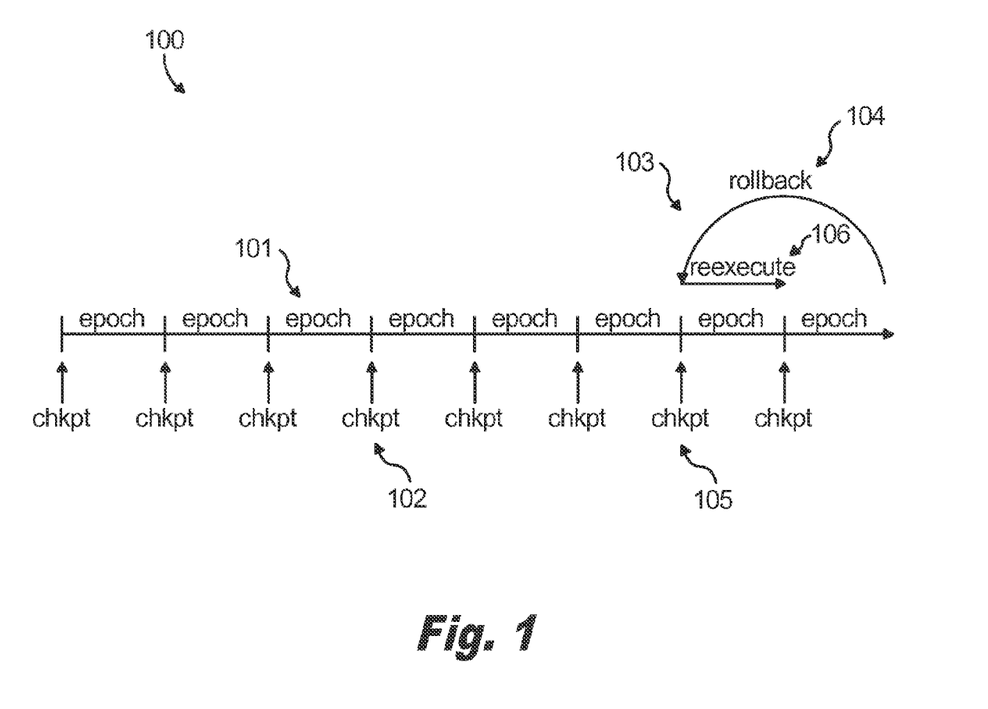
FIG. 1 is an illustration of a rollback in a program execution according to an embodiment of the present disclosure.

Referring to FIG. 1, according to an exemplary embodiment of the present disclosure, a program execution 100 is divided into a series of epochs, e.g., 101. A checkpointing method 102 is performed at a point between sequential epochs (sequential in time). In a case where a backstep operation 103 is needed, the program execution is rolled back 104 to a latest checkpoint 105, where an associated instruction is re-executed 106.

According to an exemplary embodiment of the present disclosure, a granularity of the epochs (e.g., how many instructions are included in each epoch) can be changed on demand. The granularity of the epochs can be determined depending on a frequency of the backstep operation. For example, in a case where a frequency of the backstep operation is increasing (e.g., as measured in absolute terms or as compared to a threshold), the granularity of the epochs can be reduced, such that the epochs include fewer instructions. In a case where the epochs include fewer instructions, an impact of the backstep operation on the program execution can be reduced. It should be understood that the granularity of the epochs is weighted against the frequency of the backstep operation, and that according to an exemplary embodiment of the present disclosure, a method seeks to maximize an efficiency of the program execution by balancing these two parameters (e.g., the granularity of the epochs and the frequency of the backstep operation).

Figure 2A:
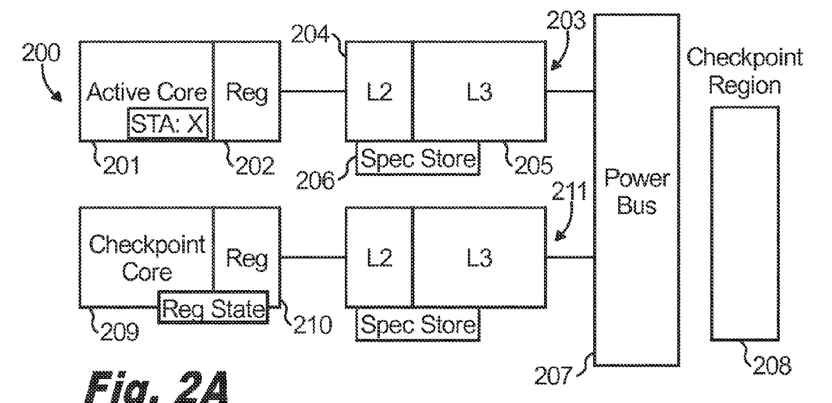
FIGS. 2A-C illustrate a method for checkpointing a program execution according to an embodiment of the present disclosure.
Figure 2B:
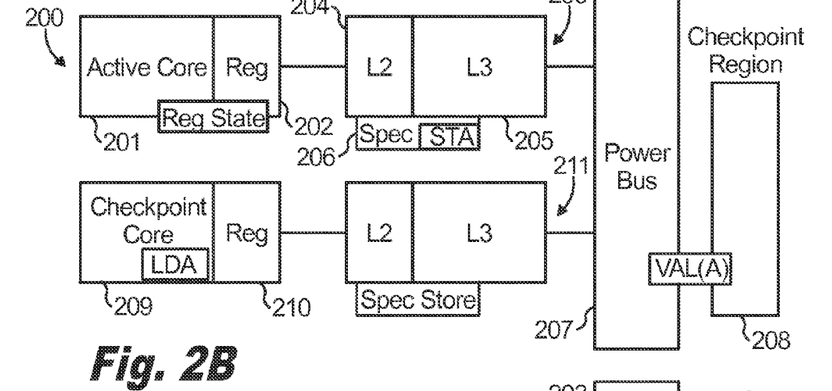
Figure 2C:
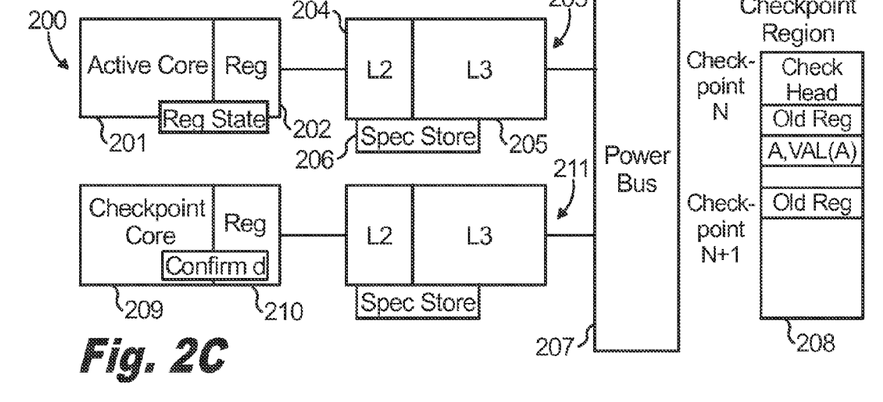

Reference will now be made to an exemplary system for performing methods according to embodiments of the present disclosure. In FIGS. 2A-C, the exemplary system 200 includes an active core 201 having a register file 202, wherein the active core 201 is connected to a first memory 203. The first memory 203 can include a level 2 (L2) cache 204 and a level 3 (L3) cache 205. The first memory 203 also includes a speculative store 206. The speculative store 206 is shown to be separate from the L2 204 and L3 205 cache; however, the speculative store 206 can be located within any portion of the first memory 203. The first memory 203 can also be connected to a bus 207, and through the bus 207 to any connected device, including a system memory (not explicitly shown) having a checkpoint region 208. The exemplary system 200 further includes a checkpoint core 209 having a register file 210, wherein the checkpoint core 209 is connected to a second memory 211. The second memory 211 can be substantially similar to the first memory 203, and therefore further description thereof is omitted.

Referring to FIGS. 2A-C, in a first exemplary implementation of a method according to an embodiment of the present disclosure, two processing cores are provided including an active core 201 and a checkpoint core 209. Each core is associated with a separate memory region 203 and 211, respectively.

As shown in FIG. 2A, the active core 201 can begin a first epoch as a transaction in which a store operation (ST) stores value X to address A (denoted as ST A:X). The first epoch (and transaction) can end either because a speculative store (206) is full or by a number of instructions performed by the system (e.g., a predetermined threshold for dividing a program execution into epochs).

As shown in FIG. 2B, at the end of the first epoch, the active core 201 forwards a list of cache line addresses located in its speculative store (ST A) to the checkpoint core 209. These include cache line addresses storing updated data. The active core 201 also forwards a register set state (e.g., the state of register 202), denoted as "Reg State," to the checkpoint core 209. The active core 201 can then wait for a confirmation from the checkpoint core 209 indicating that the list of cache line addresses and the register set state have been received. Upon receipt of the confirmation, the active core 201 can commit the transaction and begin a second epoch (e.g., next transaction).

Meanwhile, in the checkpoint core 209, the list of cache line addresses is received. The checkpoint core 209 can then perform a load operation (LD) on the received cache line addresses (e.g., LD A), retrieving non-speculative values from main memory, which are to be stored in the checkpoint region 208, and are associated with the cache line addresses (VAL(A)) at the beginning of the first epoch.

As shown in FIG. 2C, the checkpoint core 209 can save the cache line addresses written to the speculative store and associated values from before the execution of the transaction. The checkpoint core 209 can also save the register set state received from the active core 201 to checkpoint for the beginning of a next epoch (e.g., the second epoch). More particularly, a speculative register state (Reg State) can be forwarded to the checkpoint core 209, and the transaction can be committed by the active core. Once the cache line addresses and associated values (from the speculative execution) and the register set state have been written to the checkpoint region 208, the checkpoint core 209 can send the confirmation to the active core 201.

Stated simply, the checkpoint core 209 sends register data (Old Reg) to the checkpoint region 208, wherein the register data can be used for a next checkpoint. The register data (Old Reg) is data from the active core's register file 202 (the active core's register state written at the beginning or before the state of the transaction). The checkpoint core 209 also sends a commit confirmation (Confirm d) to the active core 201. In one exemplary embodiment, the register state can be saved at the beginning of each epoch, and later changed lines (register data) can be saved at an end of the epoch.

FIG. 2C further shows "check head" data stored in the checkpoint region 208. The check head data is metadata associated with the checkpoint, e.g., how much data is associated with the checkpoint, an execution time, etc.

Figure 3A:
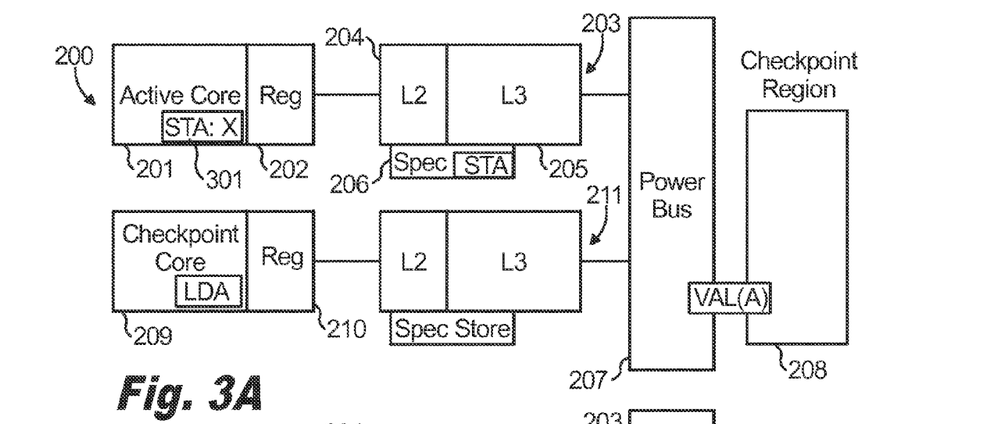
FIGS. 3A-C illustrate a method for checkpointing a program execution according to an embodiment of the present disclosure.
Figure 3B:
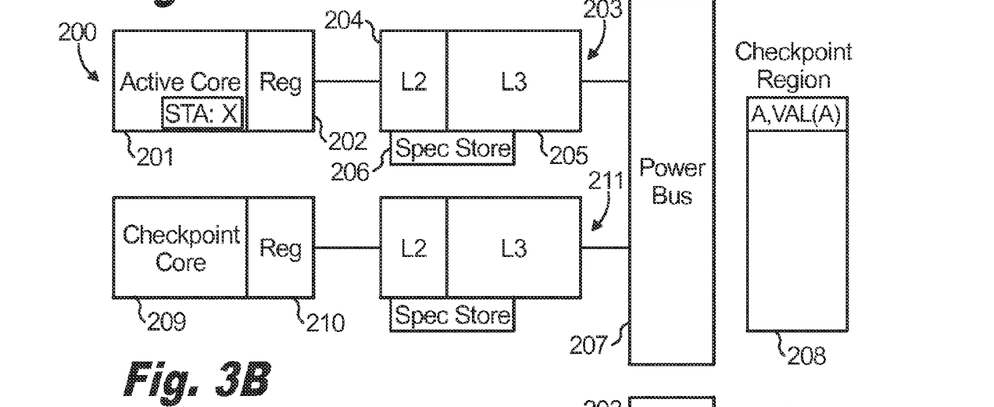
Figure 3C:
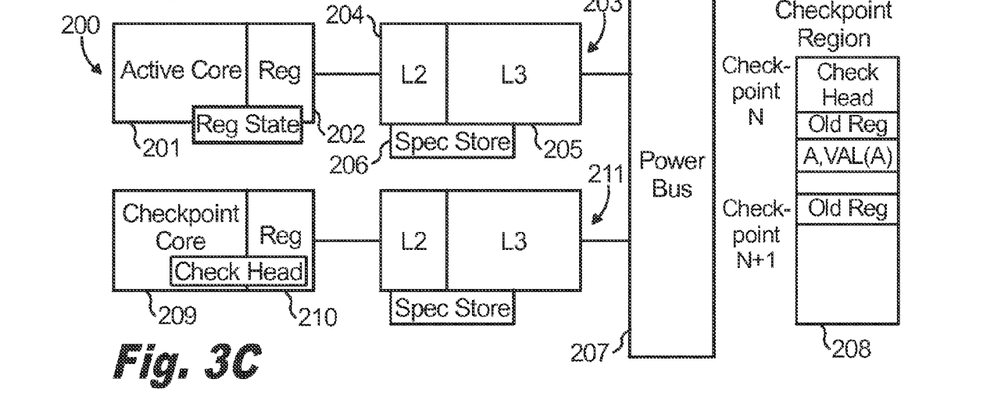

Referring to FIGS. 3A-C, the system 200 of FIGS. 2A-C can be implemented to perform a second exemplary implementation of a method according to an embodiment of the present disclosure. Therefore, common elements are referred to using the labels of FIGS. 2A-C and a further description of the system 200 is omitted.

As shown in FIGS. 3A-C, the checkpoint core 209 can generate a memory checkpoint concurrently with the active core execution. More particularly, the active core 201 can begin an execution of an epoch (transaction) and upon updating/writing a cache line address to the speculative store 206, the active core 201 forwards the updated cache line address to the checkpoint core 209. The checkpoint core 209 can receive the updated cache line address and perform a non-speculative load of that address (e.g., (LD A)), and saves the address and loaded value (VAL(A)) to the checkpoint region 208.

Upon the creation of a checkpoint, the active core 201 forwards its register state (Reg State) to the checkpoint core 209, waits for a confirmation from the checkpoint core 209 and commits the transaction. Upon committing the transaction, the active core 201 can begin a new transaction. Here, the checkpoint core 209 receives the new register state from the active core 201, writes the new register state to the checkpoint region 208 (checkpoint N+1), closes the checkpoint N (e.g., writes a header), and sends a confirmation to the active core 201.

As shown in FIG. 3A, during concurrent checkpointing, the active core 201 begins a speculative execution of a program of instructions. Here, the active core 201 executes a store operation 301 for the value (X) at an address (A), installing the store in the speculative store 206 (ST A) and forwarding the store address to the checkpoint core 209. The checkpoint core 209 loads the address (LD A) and writes to the address and the value of the address to the checkpoint region 208.

As shown in FIG. 3B, for a second store 302 during the concurrent checkpointing, the active core 201 commits a store (e.g., the value of the store is installed into the speculative store), wherein the store is updated in the speculative store 206 and if the store address is already in speculative store 206, exits.

As shown in FIG. 3C, for a commit during the concurrent checkpointing, the active core 201 commits the transaction, wherein the active core 201 forwards a register set state (e.g., the state of the register), to the checkpoint core 209. The checkpoint core sends register data to the checkpoint region for basis of a next checkpoint. The checkpoint core 209 sends a commit confirmation to the active core 201 and sends a checkpoint header to a memory checkpoint region 208. Here, the active core does not commit the transaction and make the speculative data available to the system until after receiving a confirmation from the checkpoint core. In this way, it can be ensured that the checkpoint core has been able to load the old values of every address speculatively updated, before releasing those speculative changes.

The checkpoint header ("Check Head" in FIG. 3C) can contain metadata about the checkpoint. The checkpoint header can include data indicating, for example, a size of the checkpoint, how many cache lines are in the checkpoint, etc. The checkpoint header can be used to determine how much data to restore on a rollback.

It should be understood that an active core can commit data in a speculative store to memory once the active core has received confirmation that the checkpoint core has saved all of the modified lines and the active core has sent a register state to a checkpoint core, assuming that the active core has stopped executing a main process. That is, a register state saving method can be performed after commit. Further, the closing of the checkpoint can be performed earlier as long as all non-speculative loads of modified cache lines have completed.

According to an embodiment of the present disclosure, the exemplary method of FIGS. 3A-C can be performed entirely in one core. In this example, a core can use a mechanism for saving modified cache address lines to L3 cache. That is, the core can transfer both the cache line address and the value stored at the cache line address to the L3 cache. The mechanism can save modified cache line addresses to a log in memory 203. The log can contain the cache line address and the value stored at the cache line address. The log can be cached in L3 cache and can move to main memory through known aging methods. The save to memory can happen the first time a transaction writes to a cache line; that event marks the cache line as speculative (in level 2 (L2) cache).

According to an exemplary embodiment of the present disclosure, changes to transaction protocol for executing the methods of FIGS. 2A-C and FIGS. 3A-C can include a change in the transaction protocol to allow the checkpoint core to access memory conflicting with active core but without aborting the active core. This would require a new transaction execution mode.

Figure 4:
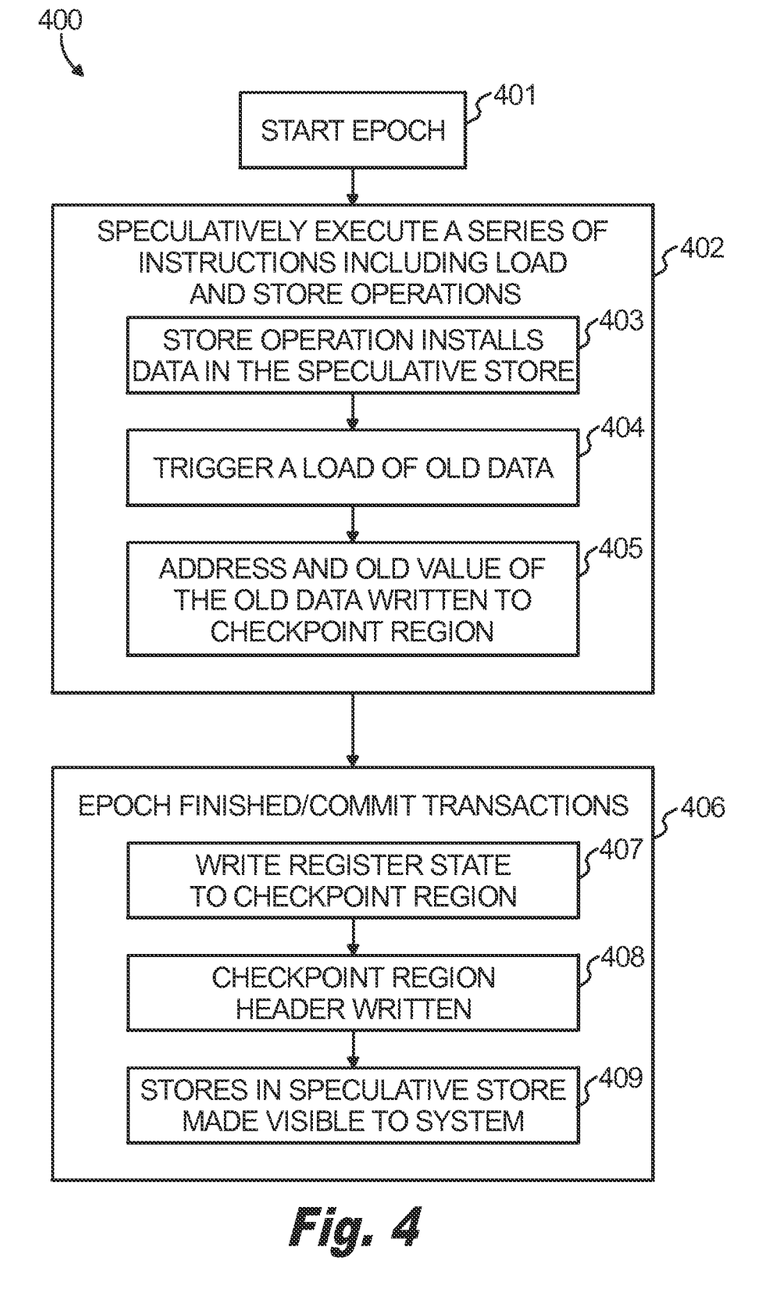
FIG. 4 is a flow diagram of an exemplary method for performing checkpointing of a program according to an embodiment of the present disclosure.

Referring now to FIG. 4, an exemplary method 400 for a single core implementation is illustrated (see also FIGS. 3A-C as described herein in connection with a single core embodiment). In FIG. 4, an epoch begins at block 401, and a processor begins a speculative execution of an epoch (transaction) at block 402. During the speculative execution (402) the processor performs a store operation that installs data in a speculative store (403), wherein the processor performs the store operation installing a cache line address and associated value in the speculative store. Data installed in the speculative store (403) triggers a load operation of old data (404) and the address and old value of the old data is written to a checkpoint region (405). At block (405) the processor writes the cache line address and associated value in the speculative store to the checkpoint region. The writing of the cache line address and associated value creates a checkpoint. The processor commits the transaction once the cache line address, associated value and register state are written to the checkpoint region. More particularly, the epoch is completed following the speculative execution (402), whereby a transaction can be committed (406). To commit the transaction (406) the processor writes a register state to a checkpoint region (407), writes a checkpoint region header (408) and makes stores in the speculative store visible to the system (409).

Figure 5:
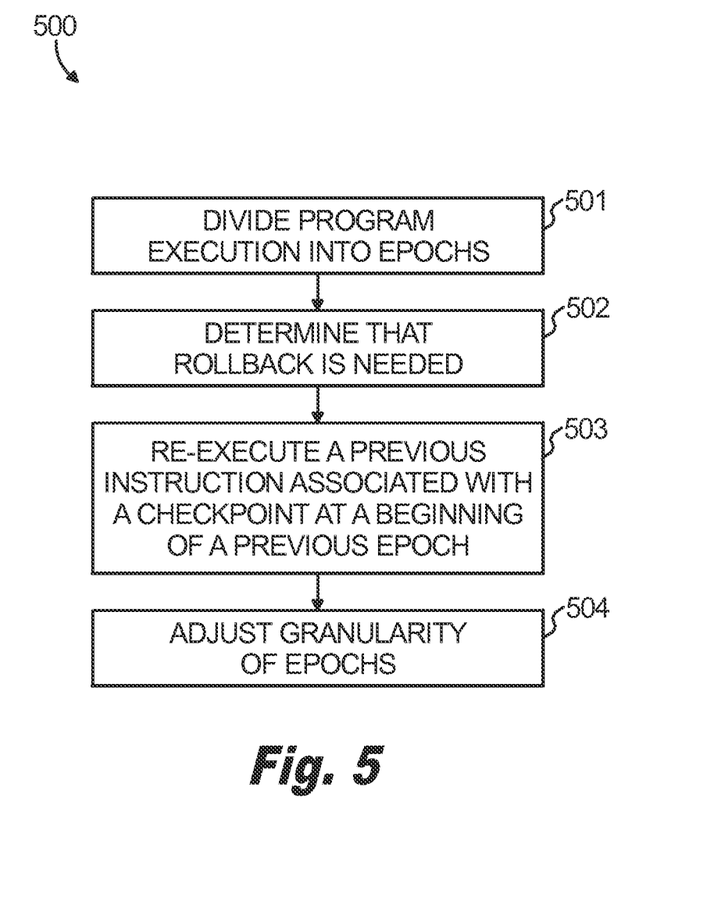
FIG. 5 is a flow diagram of an exemplary method for performing backstepping of a program according to an embodiment of the present disclosure.

Referring to FIG. 5, a method for backstepping (e.g., rollback and re-execution) can include dividing a program execution into a plurality of epochs 501. For example, a program execution is divided into epochs including 1,000 instructions. As will be described later, the size of the epochs can be changed dynamically.

At block 502, in a case where a rollback is needed (e.g., in the case of an error, or where in event is detected during program de-bugging), a previous epoch including one or more previous instructions is re-executed 503.

At block 503, the previous epoch is associated with a checkpoint marking a beginning of the epoch (e.g., the epoch in which an error is detected, or the last previously completed epoch). That is, the cache line address and associated value that existed at the beginning of the epoch to be re-executed are loaded from checkpoint region. Recall that the checkpoint core stores the cache line address and values of the previous epoch.

At block 504, based on the frequency of the backstepping operations, the granularity of the epochs can be adjusted. For example, a granularity of an initial epoch may be set to some relatively large size (100-1000 instructions) or long time, and once an event requiring rollback is detected, the epochs can be adjusted to a relatively small granularity (for example, down to a single instruction). Similarly, if an executed program runs for a certain number of instructions or time without a rollback operation, then the granularity of the epochs can be increased.

The methodologies of embodiments of the disclosure may be particularly well-suited for use in an electronic device or alternative system. Accordingly, embodiments of the present disclosure may take the form of an entirely hardware embodiment or an embodiment combining software and hardware aspects that may all generally be referred to herein as a "processor", "circuit," "module" or "system." Furthermore, embodiments of the present disclosure may take the form of a computer program product embodied in one or more computer readable medium(s) having computer readable program code stored thereon.

Furthermore, it should be noted that any of the methods described herein can include an additional step of providing a system (e.g., a multi-core system according to FIGS. 2A-C and FIGS. 3A-C) comprising distinct software modules embodied on one or more tangible computer readable storage media. All the modules (or any subset thereof) can be on the same medium, or each can be on a different medium, for example. The modules can include any or all of the components shown in the figures. In a non-limiting example, the modules include a first module for dividing a program execution, a second module for determining that a rollback is needed, a third module for re-executing an instruction of a previous epoch, and a fourth module for determining a granularity of the epochs. Further, a computer program product can include a tangible computer-readable recordable storage medium with code adapted to be executed to carry out one or more method steps described herein, including the provision of the system with the distinct software modules.

Any combination of one or more computer usable or computer readable medium(s) may be utilized. The computer-usable or computer-readable medium may be a computer readable storage medium. A computer readable storage medium may be, for example but not limited to, an electronic, magnetic, optical, electromagnetic, infrared, or semiconductor system, apparatus, device, or any suitable combination of the foregoing. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus or device.

Computer program code for carrying out operations of embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present disclosure are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions.

These computer program instructions may be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Figure 6:
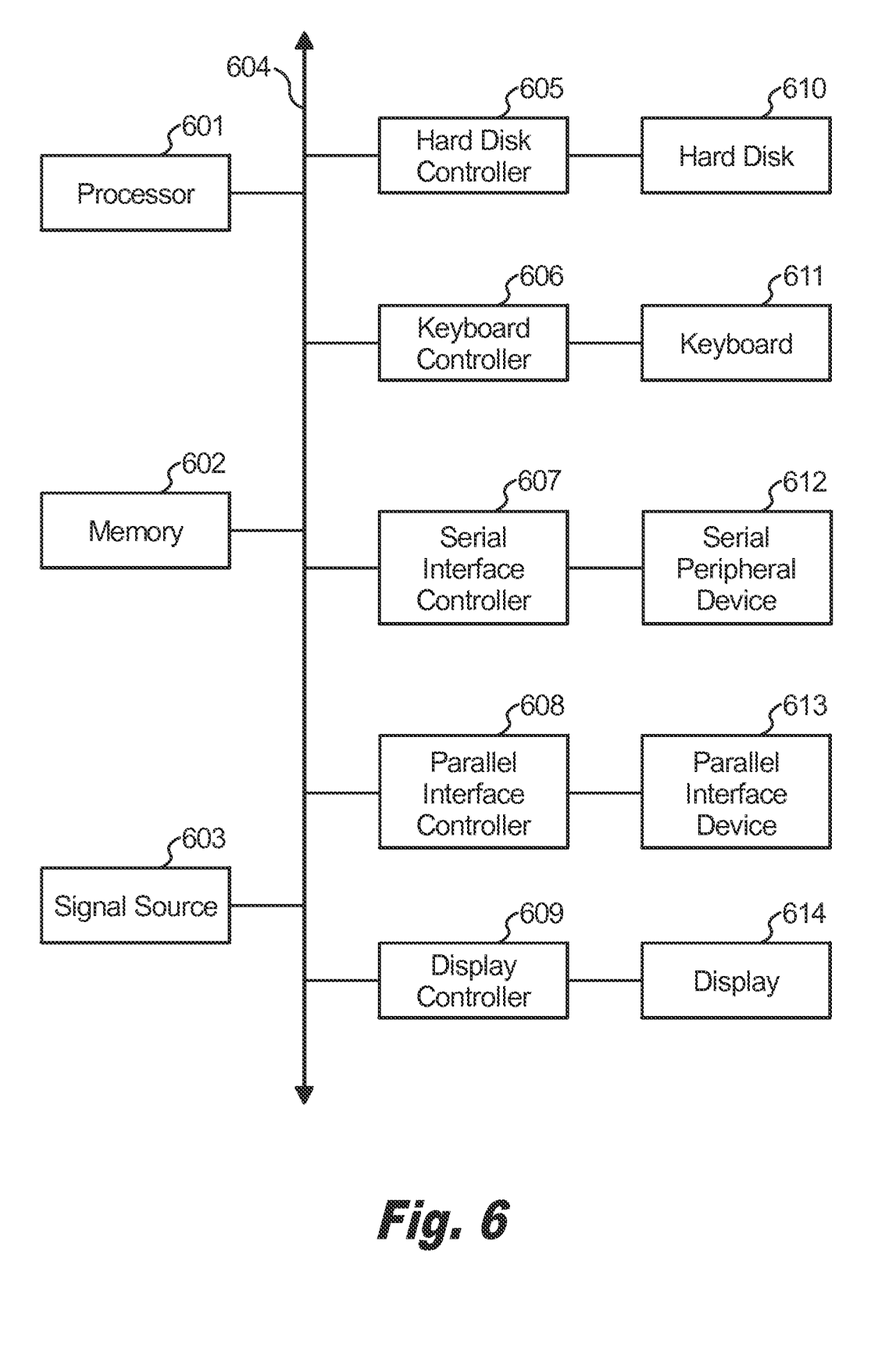
FIG. 6 is a block diagram depicting an exemplary computer system for determining a kernel according to an embodiment of the present disclosure.

For example, FIG. 6 is a block diagram depicting an exemplary computer system for backstepping through a program execution according to an embodiment of the present disclosure. The computer system shown in FIG. 6 includes a processor 601, memory 602, signal source 603, system bus 604, Hard Drive (HD) controller 605, keyboard controller 606, serial interface controller 607, parallel interface controller 608, display controller 609, hard disk 610, keyboard 611, serial peripheral device 612, parallel peripheral device 613, and display 614.

In these components, the processor 601, memory 602, signal source 603, HD controller 605, keyboard controller 606, serial interface controller 607, parallel interface controller 608, display controller 609 are connected to the system bus 604. The hard disk 610 is connected to the HD controller 605. The keyboard 611 is connected to the keyboard controller 606. The serial peripheral device 612 is connected to the serial interface controller 607. The parallel peripheral device 613 is connected to the parallel interface controller 608. The display 614 is connected to the display controller 609.

In different applications, some of the components shown in FIG. 6 can be omitted. The whole system shown in FIG. 6 is controlled by computer readable instructions, which are generally stored in the hard disk 610, EPROM or other non-volatile storage such as software. The software can be downloaded from a network (not shown in the figures), stored in the hard disk 610. Alternatively, software downloaded from a network can be loaded into the memory 602 and executed by the processor 601 so as to complete the function determined by the software.

The processor 601 may be configured to perform one or more methodologies described in the present disclosure, illustrative embodiments of which are shown in the above figures and described herein. Embodiments of the present disclosure can be implemented as a routine that is stored in memory 602 and executed by the processor 601 to process the signal from the signal source 603. As such, the computer system is a general-purpose computer system that becomes a specific purpose computer system when executing the routine of the present disclosure.

Although the computer system described in FIG. 6 can support methods according to the present disclosure, this system is only one example of a computer system. Those skilled of the art should understand that other computer system designs can be used to implement the present invention.

It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to a multi-core processor that contains multiple processing cores in a processor or more than one processing device, and that various elements associated with a processing device may be shared by other processing devices.

The term "memory" as used herein is intended to include memory and other computer-readable media associated with a processor or CPU, such as, for example, random access memory (RAM), read only memory (ROM), fixed storage media (e.g., a hard drive), removable storage media (e.g., a diskette), flash memory, etc. Furthermore, the term "I/O circuitry" as used herein is intended to include, for example, one or more input devices (e.g., keyboard, mouse, etc.) for entering data to the processor, and/or one or more output devices (e.g., printer, monitor, etc.) for presenting the results associated with the processor.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although illustrative embodiments of the present disclosure have been described herein with reference to the accompanying drawings, it is to be understood that the disclosure is not limited to those precise embodiments, and that various other changes and modifications may be made therein by one skilled in the art without departing from the scope of the appended claims.

What is claimed is:

1. A method of backstepping through a program execution comprising:
    dividing the program execution into a plurality of epochs, wherein the program execution is performed by an active core;
    determining, during a subsequent epoch of the plurality of epochs, that a rollback is to be performed;
    performing the rollback including re-executing a previous epoch of the plurality of epochs, wherein the previous epoch includes one or more instructions of the program execution stored by a checkpointing core; and
    adjusting a granularity of the plurality of epochs according to a frequency of the rollback,
    wherein adjusting the granularity of the plurality of epochs according to the frequency of the rollback further comprises reducing a number of instructions defining an epoch as the frequency of the rollback increases.

2. The method of claim 1, wherein dividing the program execution into a plurality of epochs includes determining a number of instructions defining an epoch.

3. The method of claim 1, wherein determining that the rollback is to be performed includes detecting an error in the program execution.

4. The method of claim 1, wherein determining that the rollback is to be performed includes detecting an event during de-bugging of a program corresponding to the program execution.

5. The method of claim 1, wherein the number of instructions defining an epoch is increased over time.

6. The method of claim 1, wherein the number of instructions defining an epoch is increased after performing a number of instructions without performing the rollback.

7. A method of checkpointing a program execution comprising:
    executing, speculatively, an epoch including at least one instruction;
    executing a store operation for a cache line address and an associated value corresponding to the at least one instruction, installing the cache line address and the associated value corresponding to the at least one instruction in a speculative store;
    writing the cache line address and the associated value installed in the speculative store to a checkpoint region to create a checkpoint; and
    writing a register state of a processor executing the epoch to the checkpoint region to create a checkpointed epoch.

8. The method of claim 7, further comprising committing the epoch after creating the checkpoint.

9. The method of claim 7, further comprises:
    dividing the program execution into a plurality of epochs including the epoch including at least one instruction, wherein the program execution is performed by an active core;
    determining, during a subsequent epoch of the plurality of epochs, that a rollback is to be performed; and
    performing the rollback including re-executing the checkpointed epoch using the checkpoint and the register state of the processor written to the checkpoint region.

10. The method of claim 9, further comprising adjusting a granularity of the plurality of epochs according to a frequency of the rollback.

11. The method of claim 9, wherein dividing the program execution into a plurality of epochs includes determining a number of instructions defining an epoch.

12. The method of claim 9, wherein determining that the rollback is to be performed includes detecting an error in the program execution.

13. The method of claim 9, wherein determining that the rollback is to be performed includes detecting an event during de-bugging of a program corresponding to the program execution.

14. The method of claim 10, wherein adjusting the granularity of the plurality of epochs according to the frequency of the rollback further comprises reducing a number of instructions defining an epoch as the frequency of the rollback increases.

15. The method of claim 14, wherein the number of instructions defining an epoch is increased over time.

16. The method of claim 14, wherein the number of instructions defining an epoch is increased after performing a number of instructions without performing the rollback.

17. A computer program product for backstepping through a program execution, the computer program product comprising:
    a computer readable storage medium having computer readable program code embodied therewith, the computer readable program code comprising:
    computer readable program code configured to divide the program execution into a plurality of epochs, wherein the program execution is performed by an active core;

computer readable program code configured to determine, during a subsequent epoch of the plurality of epochs, that a rollback is to be performed;

computer readable program code configured to perform the rollback including re-executing a previous epoch of the plurality of epochs, wherein the previous epoch includes one or more instructions of the program execution stored by a checkpointing core; and computer readable program code configured to adjust a granularity of the plurality of epochs according to a frequency of the rollback, wherein a number of instructions defining an epoch is reduced as the frequency of the rollback increases.

18. A computer program product, comprising a computer usable medium having a computer readable program code embodied therein, said computer readable program code configured to be executed by a processor to implement a method for checkpointing a program execution, said method comprising:

executing, speculatively, an epoch including at least one instruction;

executing a store operation for a cache line address and an associated value corresponding to the at least one instruction, installing the cache line address and the associated value corresponding to the at least one instruction in a speculative store;

writing the cache line address and the associated value installed in the speculative store to a checkpoint region to create a checkpoint; and writing a register state of a processor executing the epoch to the checkpoint region to create a checkpointed epoch.

19. A method of concurrent checkpointing in a multi-core system comprising:

signaling, by an active core, an end of a transaction to a checkpoint core;

checking, by the checkpoint core, that all lines updated by the active core during the transaction have been fetched and saved to a checkpoint memory region;

signaling, by the checkpoint core, to the active core that the active core can commit the transaction; and committing, by the active core, the transaction, wherein the active core forwards register data to the checkpoint core.

* * * * *